United States Patent [19]

Hayd

[11] Patent Number: 5,941,127
[45] Date of Patent: Aug. 24, 1999

[54] CLUTCH CABLE CONTROL DEVICE

[76] Inventor: Juan Gerardo Hayd, Esmerelda 319 Piso 7, Buenos Aires, Argentina

[21] Appl. No.: 08/833,609

[22] Filed: Apr. 3, 1997

[51] Int. Cl.[6] ................................................. G05G 11/00
[52] U.S. Cl. ............................................ 74/489; 74/502.2
[58] Field of Search .................................... 74/489, 502.2

[56] References Cited

U.S. PATENT DOCUMENTS

| | | | |
|---|---|---|---|
| 1,606,099 | 11/1926 | Rudolph . | |
| 4,232,565 | 11/1980 | Leonheart . | |
| 5,448,927 | 9/1995 | Lumpkin | 74/202.2 |
| 5,515,743 | 5/1996 | Lumpkin | 74/502.2 |
| 5,660,082 | 8/1997 | Hsieh | 74/502.2 |
| 5,669,268 | 9/1997 | Tsai | 74/502.2 |
| 5,778,729 | 7/1998 | Tsai | 74/489 |

*Primary Examiner*—John A. Jeffery
*Assistant Examiner*—David Fenstermacher
*Attorney, Agent, or Firm*—Sterne, Kessler, Goldstein & Fox P.L.L.C.

[57] ABSTRACT

A device for controlling the operation of a clutch in a motorcycle, the device being capable of changing the point wherein the clutch operating cable is fixed to the clutch lever in the handle bar of the motorcycle, to vary the characteristics of lever operation and the relationship between the lever movement and the resulting cable movement, the clutch lever comprising more than one anchoring points to fix the cable thereto.

5 Claims, 2 Drawing Sheets

CLUTCH CABLE CONTROL DEVICE

BACKGROUND OF THE INVENTION

1. Field of the Invention

The present invention relates to the control of operative mechanisms in engine actuated machines and, more particularly, refers to a device for operating the clutch or the brakes in motorcycles and cycles.

2. Description of the Prior Art

Motorcycle clutches are provided to engage a motorcycle engine to the transmission mechanisms when power transmission to the wheels are needed and to disengage the transmission from the wheels when the motorcycle is to be stooped. The clutch is generally operated through a cable formed by an outer sheath and an inner core, that is a cable of the type called a Bowden cable. The cable is connected to a manually operated lever pivotally mounted on a handle bar of the motorcycle.

An end of the clutch cable is connected to the clutch for actuating the plates of the clutch while an opposite end of the cable is connected to an anchoring point in the pivoting lever. An only one anchoring point is fixed to only one predetermined position in a cable connecting portion of the lever. Thus, a predetermined rotation of the clutch lever will always cause the clutch plates to move along the same distance for coupling and uncoupling the clutch. It is well known that the distance along which the clutch plates move varies with the plates wearing during the use. It is also known that many motorcycle drivers differ as to the best "sensitivity" that such motorcycle manually operated controls should have. Thus, some motorcyclists prefer "hard" clutch levers while others prefer to use "soft" levers. In addition, some drivers prefer a lever to be moved along an extended arc to cause the clutch plates to be engaged and disengaged while others prefer to have a sudden engagement or disengagement of the plates with a small lever stroke.

It would be therefore very convenient to have a mechanism to control the operation of a clutch in a motorcycle wherein the distance along which the clutch plates move and the "sensitivity" of the control could be easily and rapidly changed.

U.S. Pat. No. 4,232,565 to Leonhearth discloses a twist-grip cable control having cable movement parallel to the axis of the twist-grip rotation for controlling a motorcycle carburetor, an intermediate bell-crank lever being pivotally mounted within a housing with the inner portion of a Bowden cable connected to one arm of the lever, the other arm of the lever operatively engaging a pin radially extending from a rotatable twist-grip sleeve, the sleeve is manually operated by the motorcyclist to move the pivoting lever and actuate on the carburetor of the motorcycle, the lever having a plurality of orifices to fix the inner portion of the cable.

U.S. Pat. No. 1,606,099 to Rudolph discloses a device comprising the combination of a fulcrum base, a lever pivoted thereon, means for holding said lever in a plurality of positions, a wire-holding plug pivotally mounted on the lever, and means for adjusting the distance of the plug from the fulcrum without detaching the plug from the lever.

The above mentioned patents provide for the changing of the distance between a wire anchoring point and a fulcrum but both mechanisms are complex and can not be used to be applied to a motorcycle for operating the clutch thereof. None of the above patents suggest or disclose a mechanism applied to a clutch, particularly to a motorcycle clutch lever, for varying the "sensitivity" thereof, to make it "softer" or "harder" or to easily adjust the lever stroke to the wearing of the clutch plates.

SUMMARY OF THE INVENTION

It is therefore an object of the invention to provide a device to control the operation of a clutch in a motorcycle, the device being capable of changing the point wherein the clutch operating cable is fixed to the clutch lever in the handle bar of the motorcycle, to vary the characteristics of lever operation and the relationship between the lever movement and the resulting cable movement, the clutch lever comprising more than one anchoring points to fix the cable thereto.

It is a further object of the invention to provide a clutch cable control device for motorcycles, of the type comprising a clutch lever mounted on a handle bar of the motorcycle, the clutch lever having a fulcrum portion pivotally connected to the handle bar by means of a pivot pin and a cable connecting portion receiving and end of a clutch cable, whereby the lever can be manually pivoted to pull on the cable and linearly move it to actuate a motorcycle clutch, wherein the cable connecting portion has at least two cable anchoring means arranged at different distances from the pivot pin, whereby the linear movement of the cable can be varied without changing the extent of rotation of the clutch lever around the pivot pin.

The above and other objects, features and advantages of this invention will be better understood when taken in connection with the accompanying drawings and description.

BRIEF DESCRIPTION OF THE DRAWINGS

The present invention is illustrated by way of example in the following drawings wherein.

DESCRIPTION OF THE PREFERRED EMBODIMENTS

Figure 1:
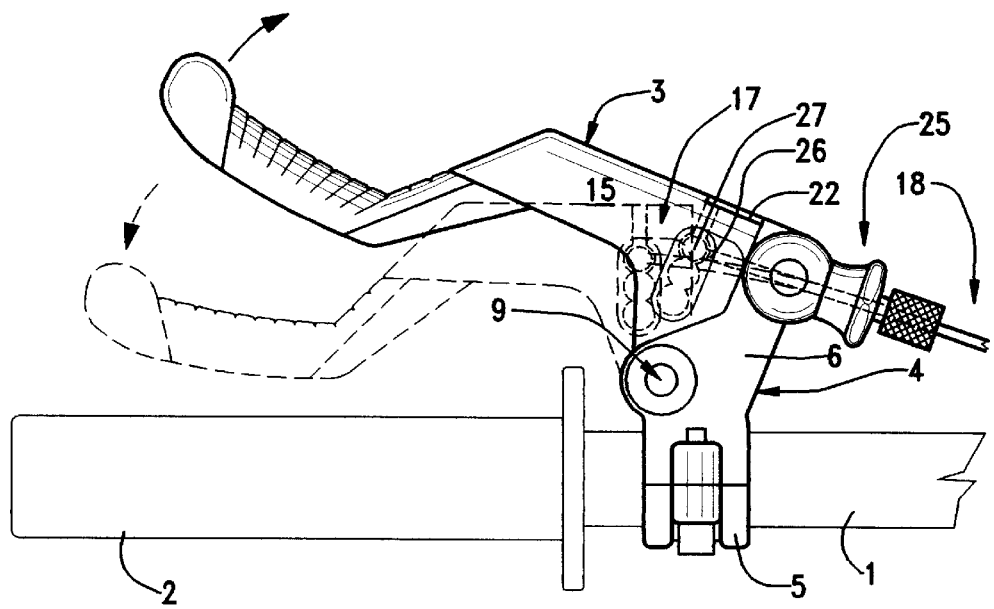
FIG. 1 is a bottom plan view, partly in section, of a clutch lever of the present invention, mounted on a handle bar by means of a support sleeve, a clutch cable being depicted as being retained in one of the anchoring means of the invention. In dotted lines is also depicted the lever in an operative position.

Referring now to the Figures in which like parts have the same numeral reference, there is shown a tubular handle bar 1 having, as usual, a handle bar gripping member 2. A clutch lever 3 including the aspects of the invention is mounted onto the handle bar 1 by means of a support sleeve 4 comprising two matting parts, namely a lower part 5 and an upper part 6, better shown in FIG. 6. Sleeve 4 may be mounted onto the handle bar and retained thereon by a pair of bolts 7 passing through orifices 8 of the lower part 5 and threadably retained into respective orifices 9' in upper part 6.

Lever 3 is pivotally mounted relative to support sleeve 4 and handle bar 1, as shown by the arrows, through a fulcrum formed by a pivot pin 9 comprising a bolt 10 and a nut 11, the bolt freely extending through an orifice 12 in the sleeve and an orifice 13 in a fulcrum portion 14 of lever 3, which orifices remain aligned when the lever is mounted on the sleeve support. Fulcrum portion 14 is preferably recessed so that outer surfaces of the lever and the support sleeve remain flush leveled when lever 3 is connected to support 4. Lever 3 has an upwardly facing upper face 15 and a downwardly oriented bottom face 16, the faces orientations being taken relative to the handle bar when the motorcycle is standing on its wheels.

Lever 3 has a clutch cable connecting portion 17 to which a clutch operating cable, generally indicated by 18, is attached to control a clutch, not illustrated, of a motorcycle. Cable 18 is usually a composite cable, preferably of the Bowden cable type, which is well known in the art, including an outer sheath not illustrated and an inner core cable shown as being the cable 18. As it is described below, cable 18 is firmly retained in the cable connecting portion of the lever and, more particularly, in one of two or more anchoring means 19 according to the invention.

Figure 2:
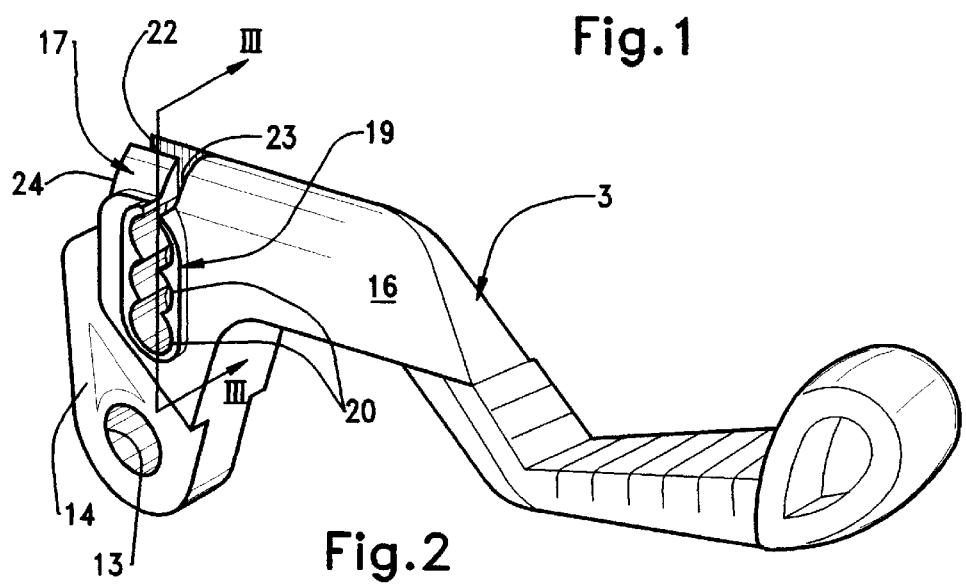
FIG. 2 is a perspective bottom view of the clutch lever alone, showing the cable anchoring means of the invention.
Figure 3:
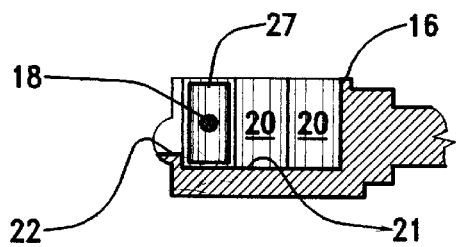
FIG. 3 is a cross section view taken along lines III—III of FIG. 2.
Figure 4:
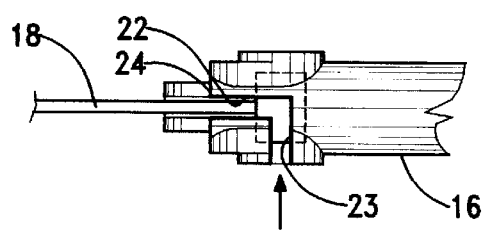
FIG. 4 is a partial top plan view of the cable connecting portion of the lever of FIG. 2, showing the cable anchoring means of the invention.
Figure 5:
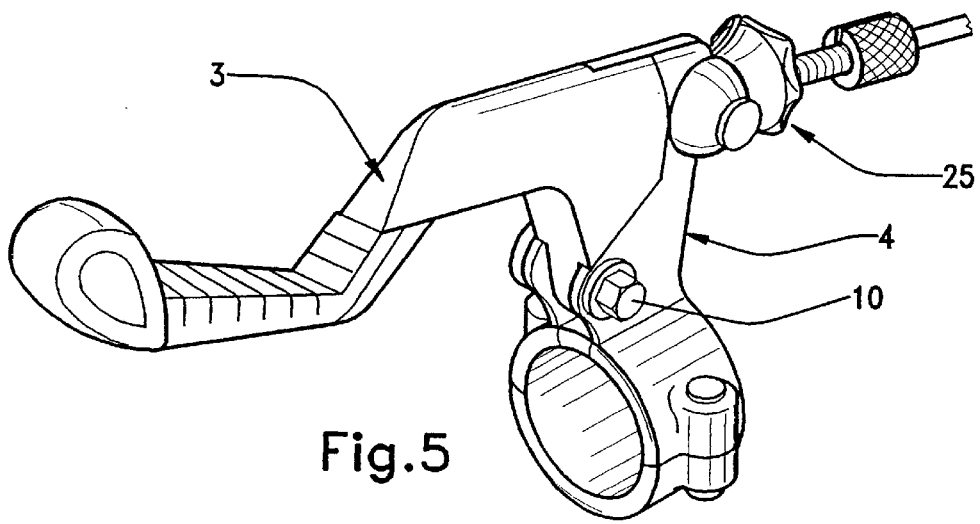
FIG. 5 is a top perspective view of the clutch lever assembled with the support sleeve, according to the present invention.

Each cable anchoring means 19 comprises a cylindrical bore 20, with three exemplary bores 20 being illustrated in FIG. 2 but, as will be apparent to any person skilled in the art, two or more than three bores can be provided. Each bore 20 is open to only one face 15, 16, and preferably is open to bottom face 16, as it is illustrated in FIGS. 2, 3, 4. Bores 20 have a bottom 21 and are connected to a channel 22 longitudinally extending relative to lever 3 and transversely extending relative to bores 20, the channel having a transverse channel length 23 open to bottom face 16 in the connecting portion of lever 3.

After passing through guide means generally indicated by 25, better described in detail in connection to FIGS. 6–9, cable 18 is received within both lengths 22, 23 of the channel. Cable 18 has a distal end, not shown, connected to the clutch of the motorcycle (not shown) and a proximal end 26 which, in turn, ends in an enlarged portion 27, such as a cylinder welded or fixed by any other suitable technique to end 26. Cylinder 27 has a through orifice and cable 18 is firmly retained within such orifice as can be seen in a front view of the cylinder in FIG. 3. To connect cable 18 to the anchoring means, cylinder 27 is inserted axially within the desired bore 20 along a direction indicated by the arrow in FIG. 4, with cable 18 passing through channel length 23. Once within bore 20, cylinder 27 is rotated so that cable 18 moves along channel 22 up to the position shown in solid lines in FIG. and phantom lines in FIG. 1. In this position, cable 18 is firmly retained in cable anchoring means 19 of lever 3. Thus, when lever 3 is manually actuated by the motorcyclist (not shown) and pivoted around pivot pin 9, as indicated by the arrows in FIG. 1, cable 18 is linearly moved, "thrown" or pulled back so as to operate the motorcycle clutch, not shown.

To keep the cable well aligned and. guided within channel 22, 23 as well as the outer sheath (not shown) of the clutch control cable retained in position and prevented from linear movement, as it is well known to any person skilled in the art, novel guiding means 25 are provided according to the invention and better illustrated in FIGS. 6–9. Guiding means 25 comprises an enlarged spherical portion or protrusion 29 at a distal end 30 of the upper part of sleeve 4. Spherical protrusion 29 has a through orifice 31 transversely extending relative to the upper part of the sleeve and to channel length 23 of clutch lever 3, when the lever is connected to support sleeve 4. A pin 32 having a through orifice 33 and a cut 34 is located within orifice 31 in such a position that orifice 33 is aligned with channel length 23 of lever 3 when lever 3 is mounted on support 4. Cut 34 is provided to allow cable 18 to be inserted within orifice as will be then explained in detail.

Figures 6, 7:
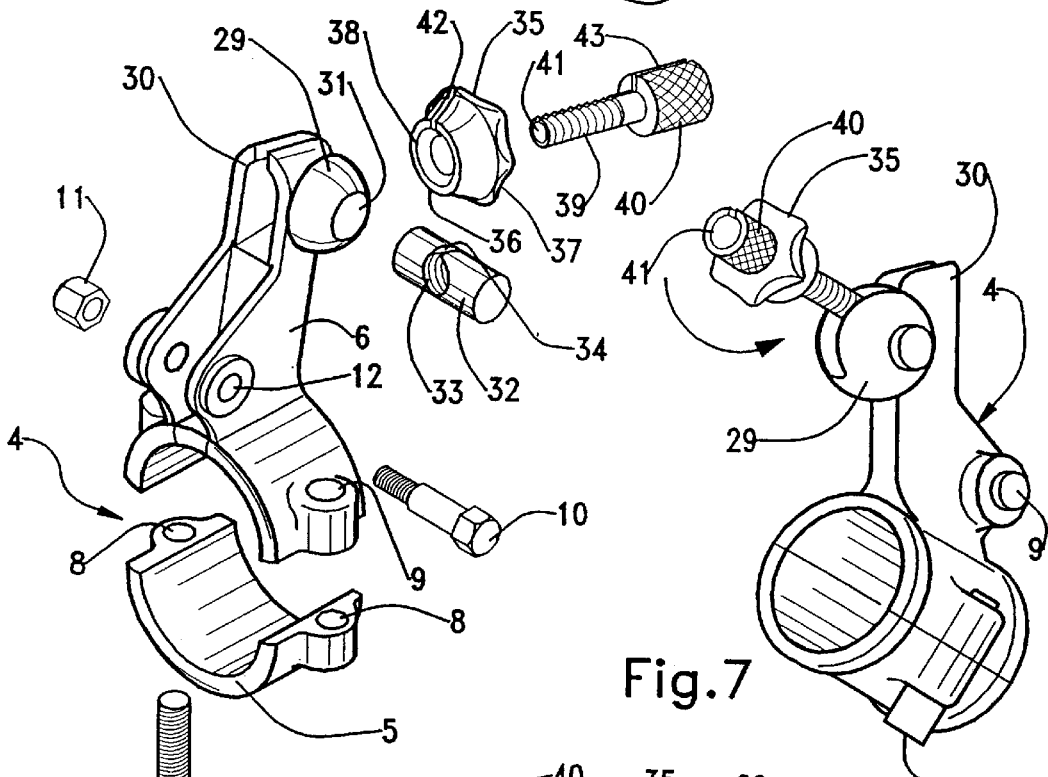
FIG. 6 is an exploded view in perspective of the two part support sleeve of the invention.
FIG. 7 is a perspective view of the two part support sleeve of the invention.
Figures 8, 9:
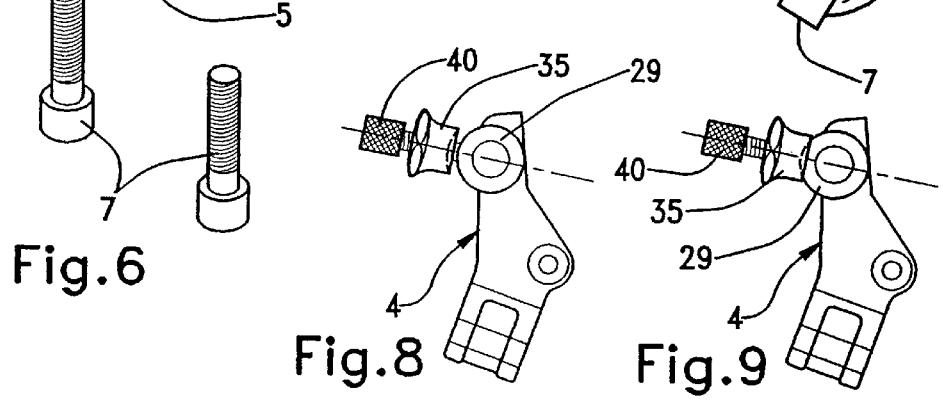
FIGS. 8 and 9 are side elevation views of the support sleeve of the invention showing cable guiding means in two different operating positions, also according to the invention.

A threaded sleeve 35 having a spherical recessed end 36 and an opposite nut shaped end 37 is also provided with a threaded through bore 38 to receive a threaded length 39 of a hollow bolt 40 having a longitudinal bore 41. Both, sleeve 35 and hollow bolt 40 has respective longitudinal cuts 42, 43, which along with cut 34 of pin 32, have a size larger than the diameter of cable 18 and must be kept aligned so that cable 18 can be inserted through cuts 34, 42, 43 to enter the respective bores 33, 38, 41. Before inserting cable 18 through cuts 34, 42, 43, pin 32 must be inserted into orifice 31, then, threaded length 39 is threadably inserted into bore 38 of sleeve 35 and threaded within bore 33 of pin 32. Bolt 40 should only be slightly threaded, without the bolt being tighten into sleeve 35 and pin 32. Then, cylinder 27 is located within the selected bore 20, cable 18 is passed into channel 22, 23 and inserted into bores 33, 38, 41. With cable 18 within bores 33, 38, 41 and cylinder retained within bore 20, bolt 40 can be pivoted as shown by the arrow in FIG. 7 so as to accommodate cable 18 to the direction along which the cable will move when operated by lever 3. With bolt 40 loosely arranged , as it is shown in FIG. 6, and once guiding means 25 are duly oriented as desired, bolt 40 is tighten enough by rotating sleeve 35 along the threaded length 39 until the spherical recessed end 36 of sleeve 35 tightly seats against the spherical protrusion 29, to firmly keep the guiding means in the desired position of operation.

Though the present invention is described in conjunction with its primary use as a clutch control for a motorcycle, it is obvious that various other uses would occur to one skilled in the art of remote control cable devices, such as for any kind of brakes, particularly to bicycle brakes.

While preferred embodiments of the present invention have been illustrated and described, it will be obvious to those skilled in the art that various changes and modifications may be made therein without departing from the scope of the invention as defined in the appended claims.

I claim:

1. A clutch cable control device for motorcycles having a clutch, of the type comprising a clutch lever for mounting on a handle bar of a motorcycle, the clutch lever having a fulcrum portion for pivotally connecting the clutch lever to a handle bar of the motorcycle by means of a pivot pin and a cable connecting portion receiving a proximal end of a clutch cable, whereby the clutch lever can be manually pivoted to pull on the cable and linearly move it for actuating the motorcycle clutch, wherein the cable connecting portion has at least two cable anchoring means for retaining the cable arranged at different distances from the pivot pin, whereby the linear movement of the cable can be varied without changing the extent of rotation of the clutch lever, wherein the clutch lever is pivotally mounted to a support sleeve comprising two detachable lower and upper parts, the lower part of the support sleeve for removably mounting the clutch lever on the handle bar and the upper part of the support sleeve having a distal end including a guide means for the clutch cable, and wherein the guide means includes a guide sleeve having a spherical recessed end movable about a spherical protrusion of said distal end of said upper part of the support sleeve, said movement accommodating the several linear directions of the clutch cable.

2. The clutch cable control device of claim 1, wherein each cable anchoring means comprises a bore connected to a channel extending along the connecting portion and ending at a leading face of the connecting portion, the channel receiving the clutch cable and the bore receiving said proximal end of the cable, said proximal end of the cable being enlarged and retained within said bore.

3. The clutch cable control device of claim 2, wherein the enlarged end comprises a cylinder having a through orifice, and the cable is firmly retained within the through orifice.

4. The clutch cable control device of claim 1, wherein the channel connects the bores to each other.

5. The clutch cable control device of claim 1, wherein the guide sleeve has a nut-shaped end opposite to the spherical recessed end.

* * * * *